US006819999B2

(12) United States Patent
Hartzheim (10) Patent No.: US 6,819,999 B2
(45) Date of Patent: Nov. 16, 2004

(54) MULTIPLE CONTROL LOOP ACCELERATION OF TURBOALTERNATOR PREVIOUS TO SELF-SUSTAINING SPEED

(75) Inventor: Anthony A. Hartzheim, Palm Beach, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

(21) Appl. No.: 10/662,130

(22) Filed: Sep. 12, 2003

(65) Prior Publication Data

US 2004/0210376 A1 Oct. 21, 2004

Related U.S. Application Data

(60) Provisional application No. 60/410,402, filed on Sep. 13, 2002.

(51) Int. Cl.[7] ................................. F02C 13/10
(52) U.S. Cl. ...................... 701/100; 290/40 A; 318/146
(58) Field of Search ............................... 710/1, 100, 36; 60/39.01; 318/146, 172; 290/40 A (56) References Cited

U.S. PATENT DOCUMENTS

| | | | | |
|---|---|---|---|---|
| 3,902,315 A | * | 9/1975 | Martin | 60/39.091 |
| 4,627,234 A | | 12/1986 | Schuh | |
| 5,172,543 A | * | 12/1992 | White | 60/778 |
| 5,428,275 A | * | 6/1995 | Carr et al. | 318/146 |
| 5,584,171 A | * | 12/1996 | Sato et al. | 60/773 |
| 5,718,111 A | | 2/1998 | Ling et al. | |
| 6,035,626 A | * | 3/2000 | Wahl et al. | 60/773 |
| 6,314,717 B1 | | 11/2001 | Teets et al. | |
| 6,357,219 B1 | | 3/2002 | Dudd, Jr. et al. | |
| 6,612,112 B2 | | 9/2003 | Gilbreth et al. | |

* cited by examiner

Primary Examiner—Richard M. Camby
(74) Attorney, Agent, or Firm—Webb Ziesenheim Logsdon Orkin & Hanson, P.C.

(57) ABSTRACT

A method for controlling the acceleration of a turbogenerator previous to self-sustaining speed.

8 Claims, 10 Drawing Sheets

MULTIPLE CONTROL LOOP ACCELERATION OF TURBOALTERNATOR PREVIOUS TO SELF-SUSTAINING SPEED

CROSS REFERENCE TO RELATED APPLICATION

This application claims the benefit of U.S. Provisional Application Ser. No. 60/410,402, filed Sep. 13, 2002, which is hereby incorporated by reference in its entirety.

BACKGROUND OF THE INVENTION

1. Field of the Invention

This invention relates generally to the field of gas turbine engines for the generation of electricity and, more particularly, to a method for controlling gas turbine engine acceleration and exhaust gas temperatures after ignition but prior to reaching self-sustaining speed.

2. Description of the Prior Art

The starting of a gas turbine engine is a complex operation. Typically, before the gas turbine engine is run on its own power, the gas turbine engine must be accelerated by an external electric source, such as a battery, to provide sufficient airflow to a combustor via a compressor for ignition. In a turboalternator having a permanent magnet rotor/generator coupled to a gas turbine engine, supplying electrical power to the permanent magnet rotor/generator will have it function as a motor to drive the gas turbine engine. Typically, engine speed varies as a function of the torque versus speed characteristics of the starter motor.

Compressed air from the compressor to the combustor increases generally with gas turbine engine speed. Typically, the gas turbine rotor is directly coupled to the compressor rotor. Ignition occurs when the speed of the engine produces enough compressed air to produce the correct ratio of air with the fuel supplied.

After ignition occurs, but prior to the gas turbine engine reaching self-sustaining speed, the acceleration rate of the gas turbine engine increases rapidly, thereby increasing the airflow. The increase in airflow requires an increase in the flow of fuel to maintain the proper fuel-to air ratio. The increased and continuous combustion occurring in the combustor also creates very high exhaust gas temperatures (EGTs). In a prior art starting procedure, the rapid increase in acceleration and EGT is controlled by setting a maximum EGT and using an open-loop control system. Thus, the fuel valves are opened until the exhaust gas temperature reaches the maximum point. At the same time, the external source is also contributing energy to the engine. The prior art starting procedure wastes energy and creates wear on the gas turbine engine. A smoother acceleration rate and lower EGT helps to prevent wear and save energy.

It is, therefore, an object of the present invention to prevent wear and conserve energy on a gas turbine engine by providing a method for controlling the acceleration rate and EGTs of a gas turbine engine after ignition, but prior to the engine reaching self-sustaining speed.

SUMMARY OF THE INVENTION

The present invention provides the method for controlling the acceleration rate and EGT (exhaust gas temperature) of a gas turbine engine that utilizes a turbine engine compressor, an annular combustor, an external electric source, such as a battery, and a control system containing a PID (Proportional Integral Derivative) controller. The annular combustor can include a single fuel source or multiple fuel sources.

Prior to operating a gas turbine engine, certain variables should be defined. A moderate EGT can be defined to ensure that the combustion chamber will not overheat. A table of rates of change of EGT can also be defined. The parameters of the table can include: 1) rotational speed of the turbine drive shaft, i.e., rotational speed; 2) temperature of the air at the inlet to the engine compressor, i.e., inlet temperature; and 3) EGT. A table of acceleration rates can be defined with parameters that are the same as the above three variables. Finally, a maximum amount of time for the gas turbine engine to reach self-sustaining speed after ignition is determined based on testing and experimentation.

The method of operating a gas turbine engine after ignition but prior to reaching self-sustaining speed involves several steps: (1) monitoring EGT, the rate of change of EGT, rotational speed of the engine rotor or turbine drive shaft, the acceleration of the engine rotor or turbine drive shaft, and the inlet temperature; (2) requesting a rate of change of EGT from a table; (3) enabling a PID controller to determine the position of the fuel valve based upon the requested rate of change of EGT; (4) retrieving two acceleration rates: an acceleration rate from the table and a current acceleration rate; (5) operating the external electric source using the greater acceleration rate; and (6) exiting the control loop either upon the gas turbine engine reaching self-sustaining speed or upon the gas turbine engine not reaching self-sustaining speed within the predetermined time.

BRIEF DESCRIPTION OF THE DRAWINGS

Additional advantages and features of the invention are explained in greater detail below with reference to the exemplary embodiments illustrated in the accompanying schematic drawings in which like reference symbols identify like parts throughout.

BRIEF DESCRIPTION OF THE PREFERRED EMBODIMENT

In a gas turbine engine, inlet air from the gas turbine compressor is continuously compressed, mixed with fuel in an inflammable proportion, and then contacted with an ignition source to ignite the mixture, which will then continue to burn. Heat energy is released causing combustion gases to flow across a turbine where it is converted to rotary energy for driving equipment, such as an electrical generator. The combustion gases are then exhausted to the atmosphere. The method of operating a gas turbine engine after ignition (sometimes referred to as lightoff), but prior to reaching self-sustaining speed, partially occurs in a combustor.

Figure 1:
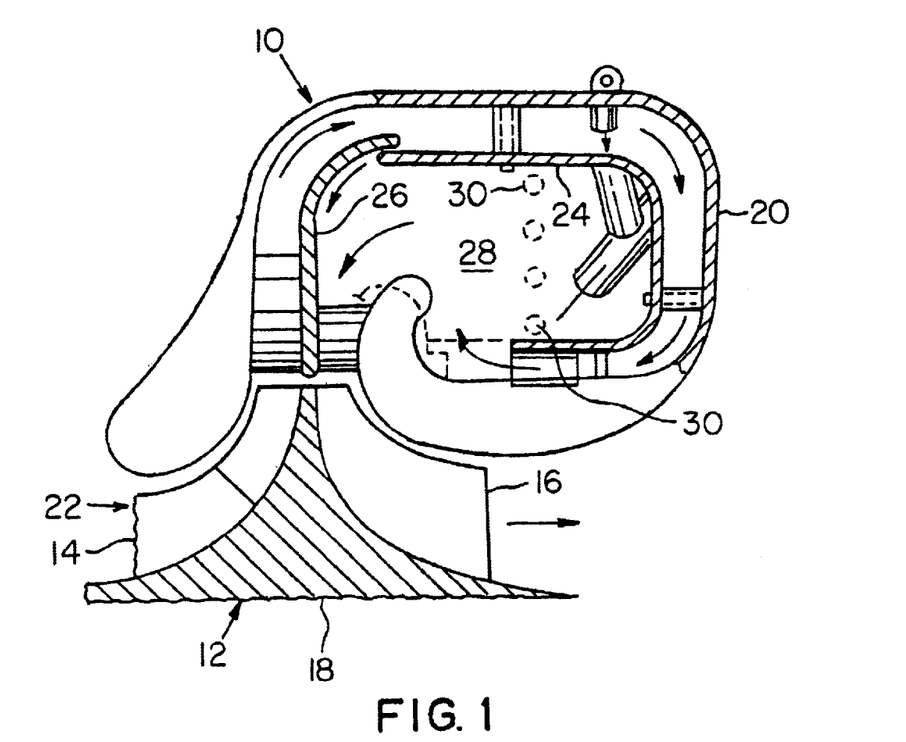
FIG. 1 is a partial section of a portion of an annular combustor.

FIG. 1 shows a partial cross section of a portion of an annular combustor 10 connected to a turbine engine compressor 12. Engine compressor 12 includes compressor blades 14 and turbine blades 16 positioned around an engine rotor or turbine drive shaft 18.

An annular outer housing wall 20 is provided and defines an air intake passage 22 positioned adjacent to compressor blades 14. An outer combustor liner wall 24 and an inner housing wall 26 define an annular combustion chamber 28. The combustion chamber 28 is supplied with a multiple number of fuel orifices 30. The method of the present invention for controlling acceleration and ECGT after ignition, but before the gas turbine engine reaches self-sustaining speed, partially occurs in the annular combustion chamber 28.

A detailed description of the annular combustor 10 is described in PCT Patent No. WO 98/25082, which is hereby incorporated by reference.

Figure 2:
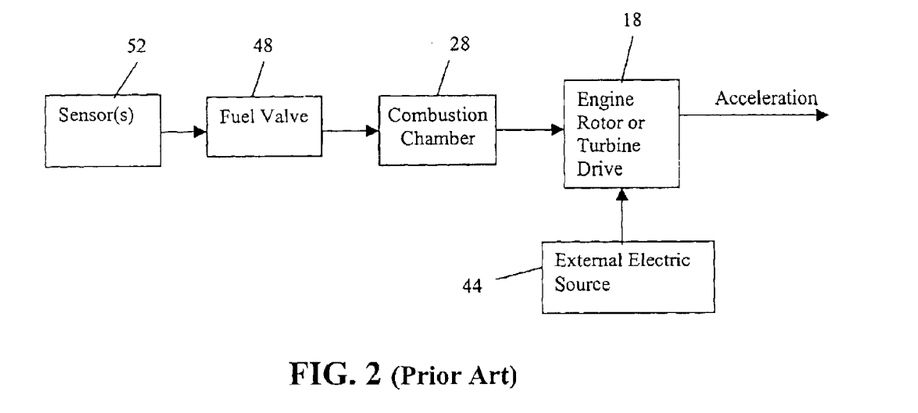
FIG. 2 is a flow diagram generally displaying a prior art method of operating a gas turbine engine.

FIG. 2 displays a general flowchart of a prior art method using open-loop control to control the operation of a gas turbine engine after ignition but prior to reaching self-sustaining speed. These prior art control methods use a constant amount of energy from an external electric source 44 to drive the engine rotor or turbine drive shaft 18 to ignition via a permanent magnet rotor/generator as described in PCT Patent No. WO 98/25082. Once ignition is reached, the external electric source 44 continues to apply a constant amount of energy to the engine rotor or turbine drive shaft 18. The engine rotor or turbine drive shaft 18 also begins to receive energy created by combustion after ignition. As the turbine rotates at an increasing rate of speed, more compressed air is produced which requires additional fuel to maintain the correct fuel-to-air ratio. This results in an uncontrolled rapid increase in acceleration. Fuel is then added to the combustion chamber 28 at a constantly increasing rate until a specified maximum EGT is reached. Once that maximum EGT is reached, the fuel valve 48 can be controlled to maintain that EGT. By "maximum EGT" is meant the maximum level of EGT that can be allowed for operation before shutting down the gas turbine engine.

Figure 3:
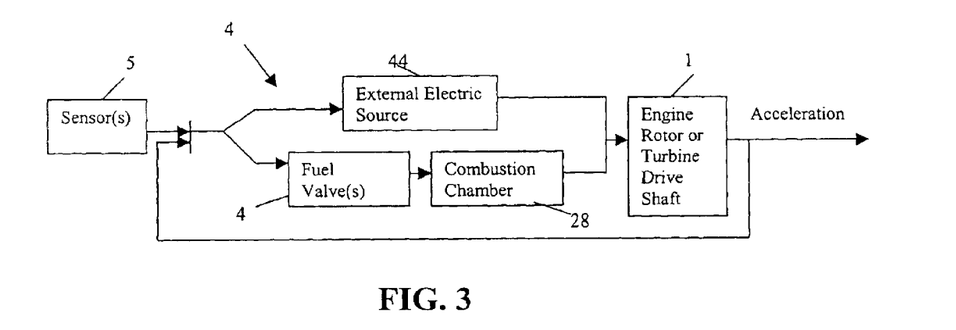
FIG. 3 is a general flow diagram of the hardware involved in the control system of the present invention.
Figure 4:
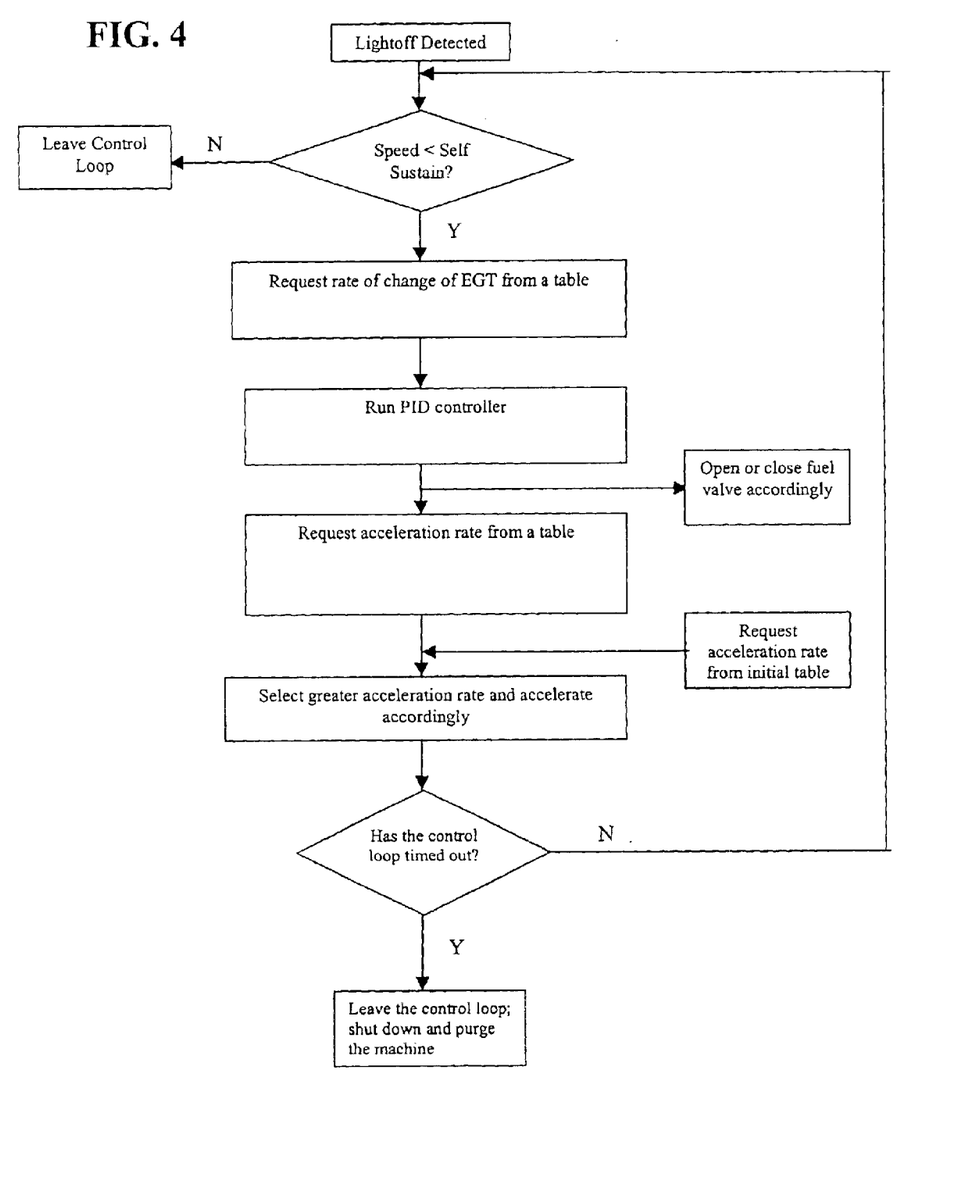
FIG. 4 is a general flow diagram of the control logic of the present invention.

FIGS. 3 and 4 represent general flowcharts of the present invention. FIG. 3 represents a flowchart of the hardware, and FIG. 4 represents a flowchart of the control logic. Referring to FIG. 3, the control system 40 controls two separate sources of energy: the external electric source 44 and the combustion chamber 28 (via control of the fuel flow rate through the fuel valve 48). Controlling the external electric source 44 and fuel valve 48 allows both to deliver energy to the engine rotor or turbine drive shaft 18 via the permanent magnet rotor/generator or through some other drive arrangement, such as an electric motor, coupled to the drive shaft. The fuel flow rate can be controlled via an adjustable fuel valve or via an adjustable rate fuel pump. The acceleration of the engine rotor or turbine drive shaft 18 is fed back into the control system 40. The EGT can be sensed by a sensor 52 and input into the control system 40. The control system 40 controls around a moderate EGT while accelerating at a desired rate. By "moderate EGT" is meant a certain level of EGT, lower than the maximum EGT, that can limit EGT exposure. By "self-sustaining speed" is meant the operating speed of the gas turbine engine using combustion energy.

Figure 5:
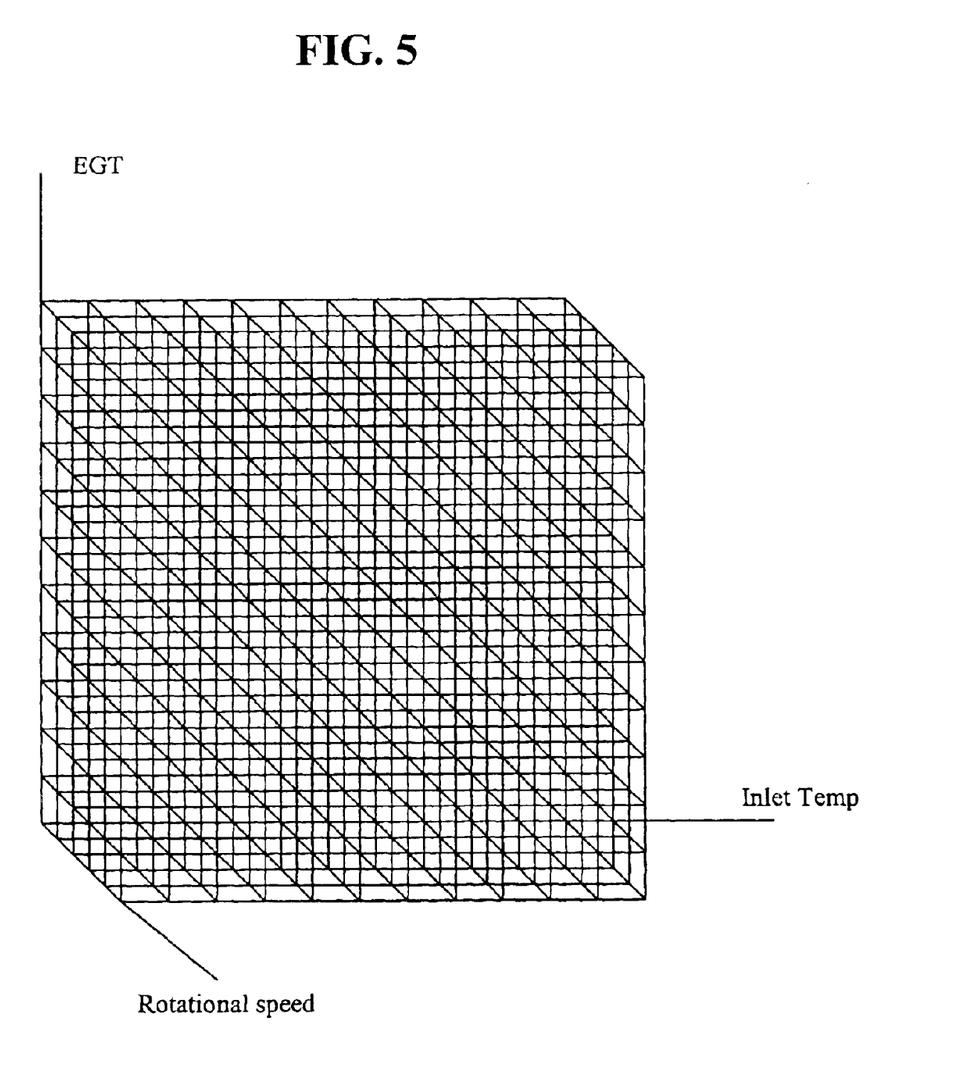
FIG. 5 is a depiction of a 3-dimensional data table.

Referring to FIGS. 3 and 4, the control system 40 is initiated when a sensor detects that lightoff has occurred in the combustion chamber 28. After lightoff occurs, a control loop engages. Control loops within the control system 40 refer to the parameters being controlled using feedback information. Within the loop, a sensor will measure the rotational speed of the engine rotor or turbine drive shaft 18. If the rotational speed has reached self-sustaining speed, the loop will be exited. Otherwise, the control system 40 will request a rate of change of the EGT. The requested rate of change of the EGT can be determined by a table with a parameter of (1) rotational speed of the engine rotor or turbine drive shaft 18; (2) the temperature of the air entering into the engine compressor 12; and (3) the EGT. FIG. 5 displays an example of a table with three axes that can be used to store acceleration rates. By defining the axis using the above-identified variables, the control system 40 can quickly request a rate of change of EGT. While the present invention uses a 3-dimensional lookup table, a function with the same three variables could also be used directly within the control system 40. The variables which are determined by sensors 52 are inputted into the control system 40. After the requested rate of change of the EGT is determined, a PID controller will determine the position of the fuel valve 48 that will allow enough fuel into the combustion chamber 28 to obtain the requested rate of change of EGT. The PD controller uses the requested rate of change of EGT and the current EGT to determine the position of the fuel valve 48. The fuel valve 48 is then opened or closed accordingly.

After the rate of change of the EGT has been controlled, the control system 40 will control the acceleration rate of the engine rotor or turbine drive shaft 18. The control system 40 will first retrieve two acceleration rates. The first acceleration rate can be determined from a 3-dimensional table, such as in FIG. 5, which parameters are: (1) rotational speed of the engine rotor or turbine drive shaft 18; (2) the temperature of the air entering into the engine compressor 12; and (3) the EGT. This first acceleration rate is the acceleration target of the engine rotor 18 for the PID loop driven by the external electric source 44. The second acceleration rate is the current acceleration rate of the engine rotor or turbine drive shaft 18. The control system 40 then chooses the greater of the two requested acceleration rates in order to quickly and smoothly reach synchronous speed.

After the desired rate of change of the EGT and the acceleration rate have been achieved, the control system 40 checks a timer to see if the control system 40 has timed out. The time entered into the timer is predetermined based on the startup rates of the particular turbogenerator and is entered as a safety precaution. If the turbogenerator takes too long to reach self-sustaining speed (the control software times out), then the control loop is exited and the machine is shut down and purged. If the control loop has not timed out, the process is started again.

Figure 6:
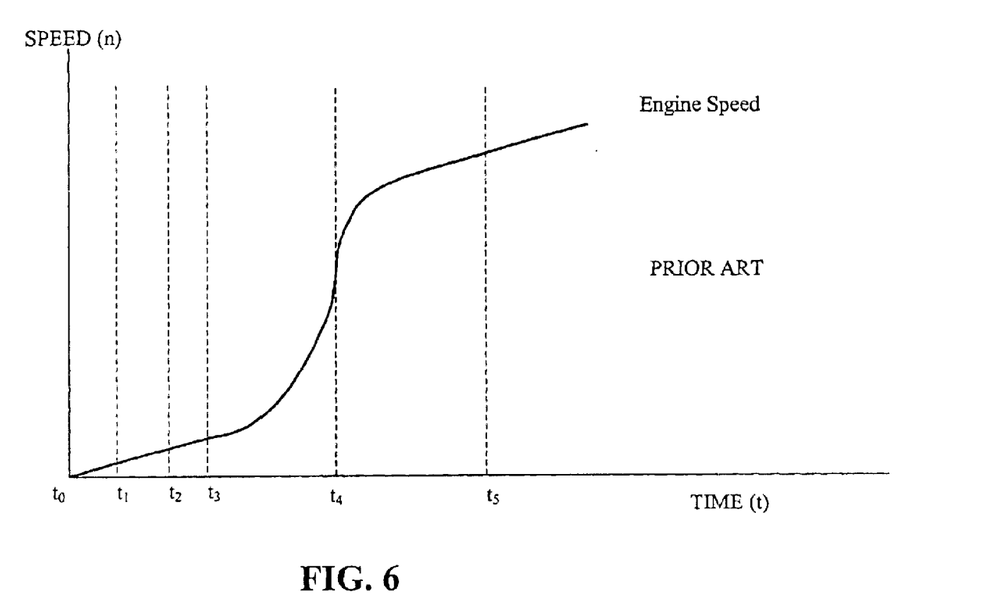
FIG. 6 is a graph of gas turbine engine speed versus time for a gas turbine engine utilizing a prior art method.

FIG. 6 graphically shows gas turbine engine speed during the startup procedure using a prior art method. At time "$t_0$", the external electric source 44 begins to drive the engine rotor or turbine drive shaft 18. At time "$t_1$", an ignitor is ignited based on ambient conditions (set prior to time "$t_0$") and the rotational speed of the compressor blades 14 and turbine blades 16. At time "$t_2$", fuel is supplied to the annular combustion chamber 28 at a constant flow rate. At time "$t_3$", ignition occurs. After ignition, energy created by combustion is added to the energy supplied by the external electric source 44. The result is a rapid increase in the acceleration rate of the engine rotor or turbine drive shaft 18. At time "$t_4$", the maximum EGT is reached and the fuel flow to the annular combustion chamber 28 is controlled. At time "$t_5$", self-sustaining speed is reached and the external electric source 44 is disabled.

Referring to FIGS. 7–11, time "$t_0$" defines the moment when the external electric source begins to drive the turbine drive shaft 18; time "$t_1$" defines the moment when the ignitor is turned on; time "$t_2$" defines the moment when the fuel valve is opened and fuel is allowed into the annular combustion chamber 28; and time "$t_3$" defines the moment when ignition occurs.

Figure 7:
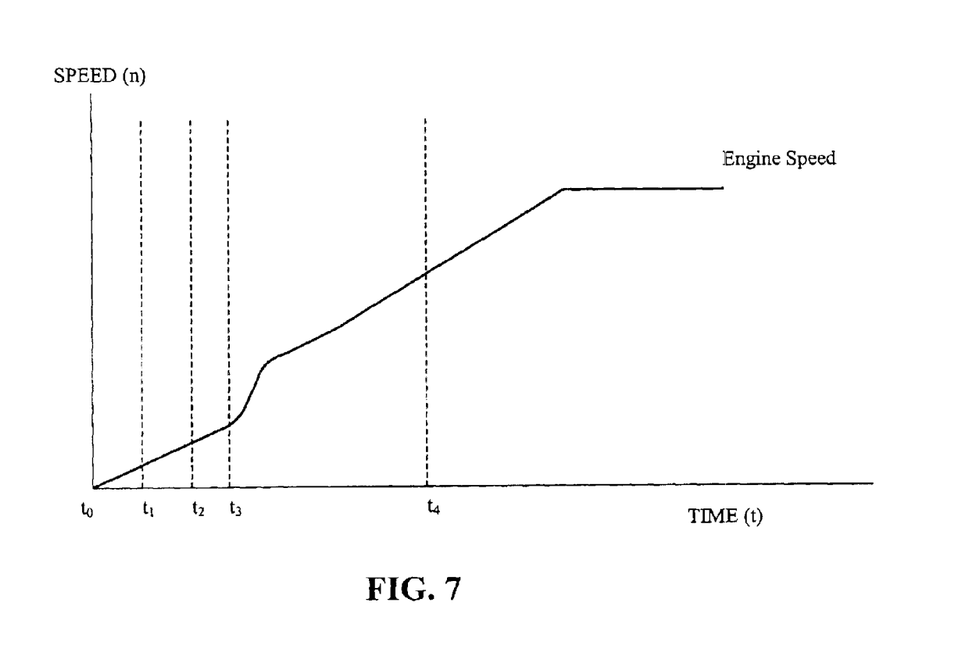
FIG. 7 is a graph of gas turbine engine speed versus time for a gas turbine engine utilizing the method of the present invention.

FIG. 7 graphically shows the engine speed of a gas turbine engine during the startup procedure using the present invention. At time "$t_3$", ignition is sensed by a heat sensor. Once ignition is sensed, the control system is initialized. Because the acceleration rate and the EGT are used simultaneously by the control system, the acceleration rate is much smoother than that described in the prior art. At time "$t_4$", the engine reaches self-sustaining speed and the external electric source 44 is disabled.

Figure 8:
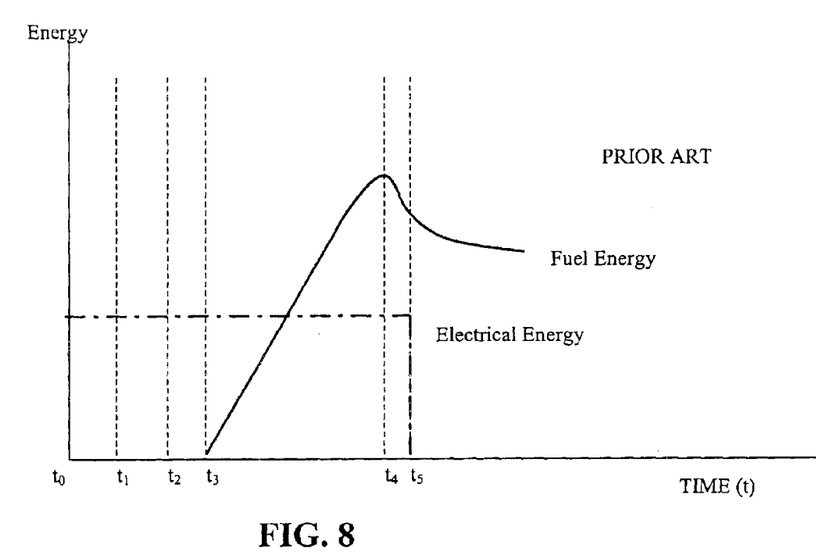
FIG. 8 is a graph of the fuel energy and electrical energy versus time for a gas turbine engine utilizing a prior art method.

FIG. 8 graphically shows the energy consumed in the startup of a gas turbine engine using a prior art method. The energy created by the external electric source and delivered to the engine rotor or turbine drive shaft 18 is held constant. At time "$t_3$", the fuel valve is opened and an increase in the rate of fuel supplied to the combustion chamber 28 (which is proportional to the increased combustion air delivered by the turbine blades 16) is generated. This burns more fuel than is necessary to drive the engine rotor or turbine drive shaft 18. At time "$t_4$", the EGT reaches a specified maximum temperature. The rate of fuel delivered to the annular combustion chamber 28 is then controlled around the EGT by an open-loop control system. At time "$t_5$", self-sustaining speed is reached and the external electric source 44 is disabled.

Figure 9:
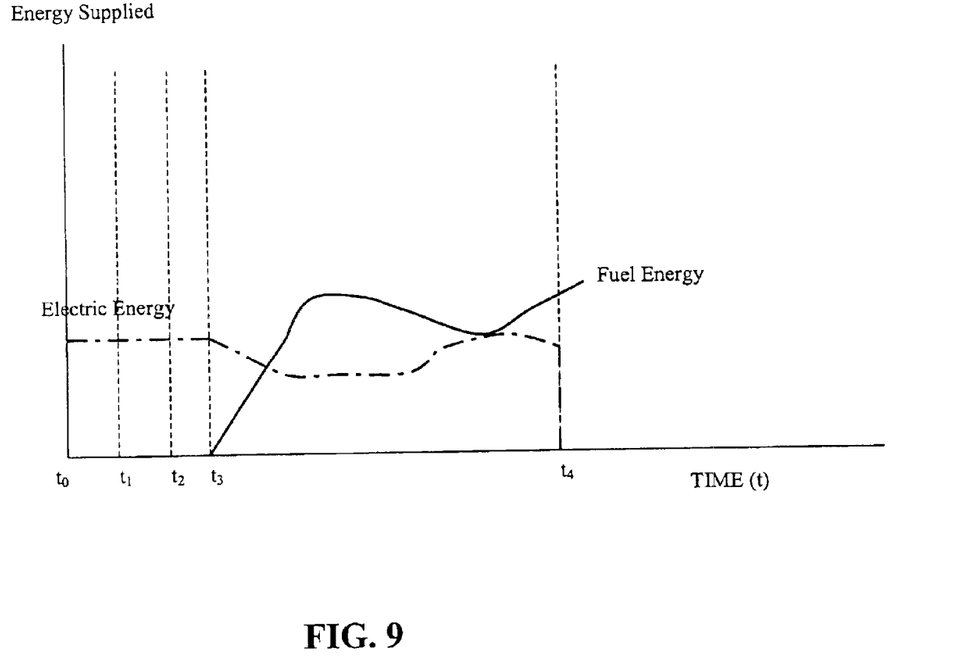
FIG. 9 is a graph of the fuel energy and electrical energy versus time for a gas turbine engine utilizing the method of the present invention.

FIG. 9 graphically shows the energy consumed in the startup of a gas turbine engine using the method of the present invention. Before time "$t_3$", the external electric source 44 delivers enough energy to the engine rotor or turbine drive shaft 18 to achieve a desired acceleration. After ignition occurs at time "$t_3$", the fuel valve 48 begins to allow fuel into the combustion chamber 28. However, the external electric source 44 and the fuel valve 48 are controlled to a moderate EGT and a desired acceleration rate using a control system 40. The control system 40 allows less energy to be used to start the gas turbine engine and avoids unnecessary wear to the gas turbine engine caused by high rates of acceleration. At time "$t_4$", the gas turbine engine has reached self-sustaining speed and the external electric source 44 is disabled.

Figure 10:
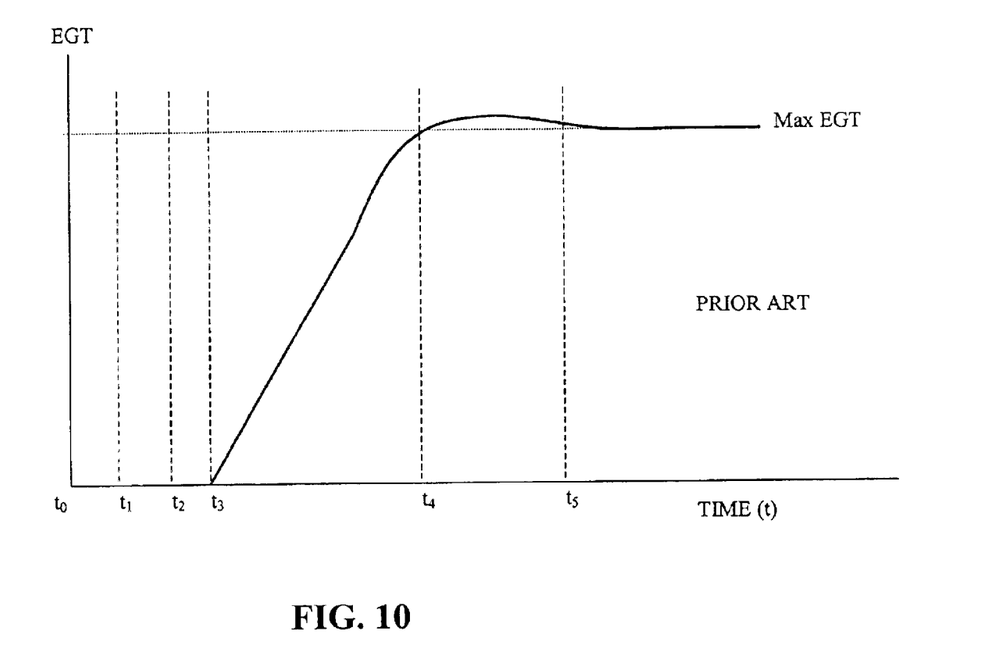
FIG. 10 is a graph of the exhaust gas temperature versus time for a gas turbine engine utilizing a prior art method.

FIG. 10 graphically shows the EGT in the startup of a gas turbine engine using a prior art method. At time "$t_3$", combustion begins to occur causing EGT to quickly rise. Fuel is added at an increasing rate to maintain the required fuel-to-air ratio as the turbine blades 16 rotate at a greater speed. During this time, the acceleration rate which is not controlled is quickly rising. The fuel valve 48 is not controlled until a predetermined EGT has been reached. At time "$t_4$", the maximum EGT has been reached. The fuel valve 48 is then controlled around the maximum EGT using open-loop control so as not to go above that maximum temperature. Acceleration of the engine rotor or turbine drive shaft 18 is never controlled. At time "$t_5$", the engine has reached self-sustaining speed and the external electric source 44 is disabled.

Figure 11:
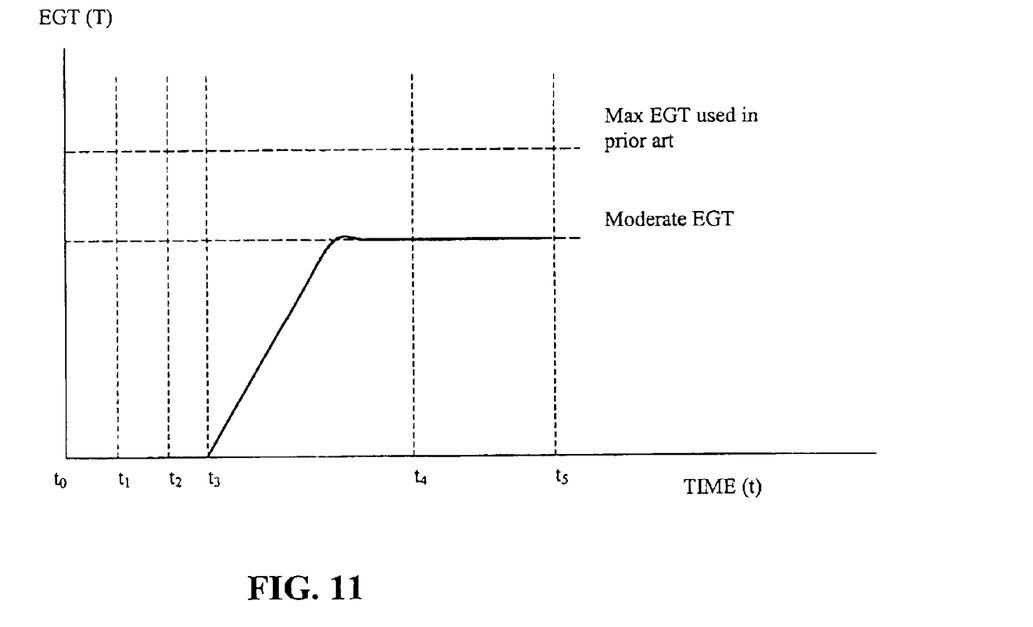
FIG. 11 is a graph of the exhaust gas temperature versus time for a gas turbine engine utilizing the method of the present invention.

FIG. 11 graphically shows the EGT in the startup of a gas turbine engine using the present invention. At time "$t_3$", ignition occurs and the EGT begins to rise. While the EGT is rising, the acceleration rate is being controlled by the combination of the energy delivered from the annular combustion chamber 28 and the external electric source 44. At time "$t_4$", the specified moderate EGT has been reached and the control system controls around that modified EGT and controls the acceleration of the system at the same time using a PED control system 40.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

I claim:

1. A method for operating a gas turbine engine prior to reaching self-sustaining speed, comprising:

a) rotating an engine rotor or turbine drive shaft of a gas turbine engine by an external source of power;

b) supplying compressed air and fuel to a combustion chamber of the gas turbine engine, thereby creating an air/fuel mixture in the combustion chamber;

c) igniting the air/fuel mixture;

d) sensing for ignition of the air/fuel mixture in the combustion chamber;

e) monitoring the EGT of the gas turbine engine, the rate of change of the EGT, the speed of the engine rotor or turbine drive shaft, the acceleration rate of the engine rotor or turbine drive shaft, and the temperature of the compressed air entering the combustion chamber;

f) defining a moderate EGT;

g) creating a table for determining rates of change of EGT based upon the rotational speed of the engine rotor or turbine drive shaft, the temperature of the compressed air entering into the combustion chamber, and the EGT;

h) creating a table for determining acceleration rates based upon the rotational speed of the engine rotor or turbine drive shaft, the temperature of the compressed air entering into the combustion chamber, and the EGT;

i) requesting a rate of change of EGT from the table of rates of change of EGT by a control system;

j) controlling the rate of change of the EGT by enabling a PID controller of the control system to control the amount of fuel entering into the combustion chamber by controlling the EGT around the moderate EGT;

k) requesting two acceleration rates by the control system, a current acceleration rate and an acceleration rate derived from the table of acceleration rates;

l) operating the external power source using the greater acceleration rate from the previous step; and m) exiting the control system upon the engine either reaching self-sustaining speed or upon the engine not reaching self-sustaining speed within a predetermined time.

2. A method for operating a gas turbine engine prior to reaching self-sustaining speed, comprising:

a) rotating an engine rotor or turbine drive shaft of a gas turbine engine by an external source of power;

b) supplying compressed air and fuel to a combustion chamber of the gas turbine engine, thereby creating an air/fuel mixture in the combustion chamber;

c) igniting the air/fuel mixture in a combustion chamber of a gas turbine engine;

d) sensing for ignition of the air/fuel mixture in the combustion chamber;

e) monitoring the EGT of the gas turbine engine, the rate of change of the EGT, the speed of an engine rotor or turbine drive shaft of the gas turbine engine, the acceleration rate of the engine rotor or turbine drive shaft, and the temperature of the compressed air entering the combustion chamber;

f) requesting a desired rate of change of EGT by a control system;

g) controlling the rate of change of the EGT by enabling a controller of the control system to control the amount of fuel entering into the combustion chamber;

h) requesting two acceleration rates by the control system, a current acceleration rate and a desired acceleration rate;

i) operating the external power source using the greater acceleration rate from the previous step; and j) exiting the control system upon the gas turbine engine either reaching self-sustaining speed or upon the gas turbine engine not reaching self-sustaining speed within a predetermined time.

3. The method as claimed in claim 2, further comprising the step of creating a table for determining rates of change of EGT based upon the rotational speed of the engine rotor or turbine drive shaft, the temperature of the compressed air entering into the combustion chamber, and the EGT.

4. The method as claimed in claim 2, further comprising the step of creating a table for determining acceleration rates based upon the rotational speed of the engine rotor or turbine drive shaft, the temperature of the compressed air entering into the combustion chamber, and the EGT.

5. The method as claimed in claim 3, wherein the rate of change of EGT is requested from the table for determining rates of change of EGT.

6. The method as claimed in claim 4, wherein the acceleration rate is derived from the table of acceleration rates.

7. The method as claimed in claim 2, further comprising the step of defining a moderate EGT.

8. The method as claimed in claim 7, wherein the amount of fuel entering into the combustion chamber is controlled by controlling the EGT around the moderate EGT.

* * * * *